W. CLAYTON.
Carriage-Brake.
No. 2,676. Patented June 18, 1842.
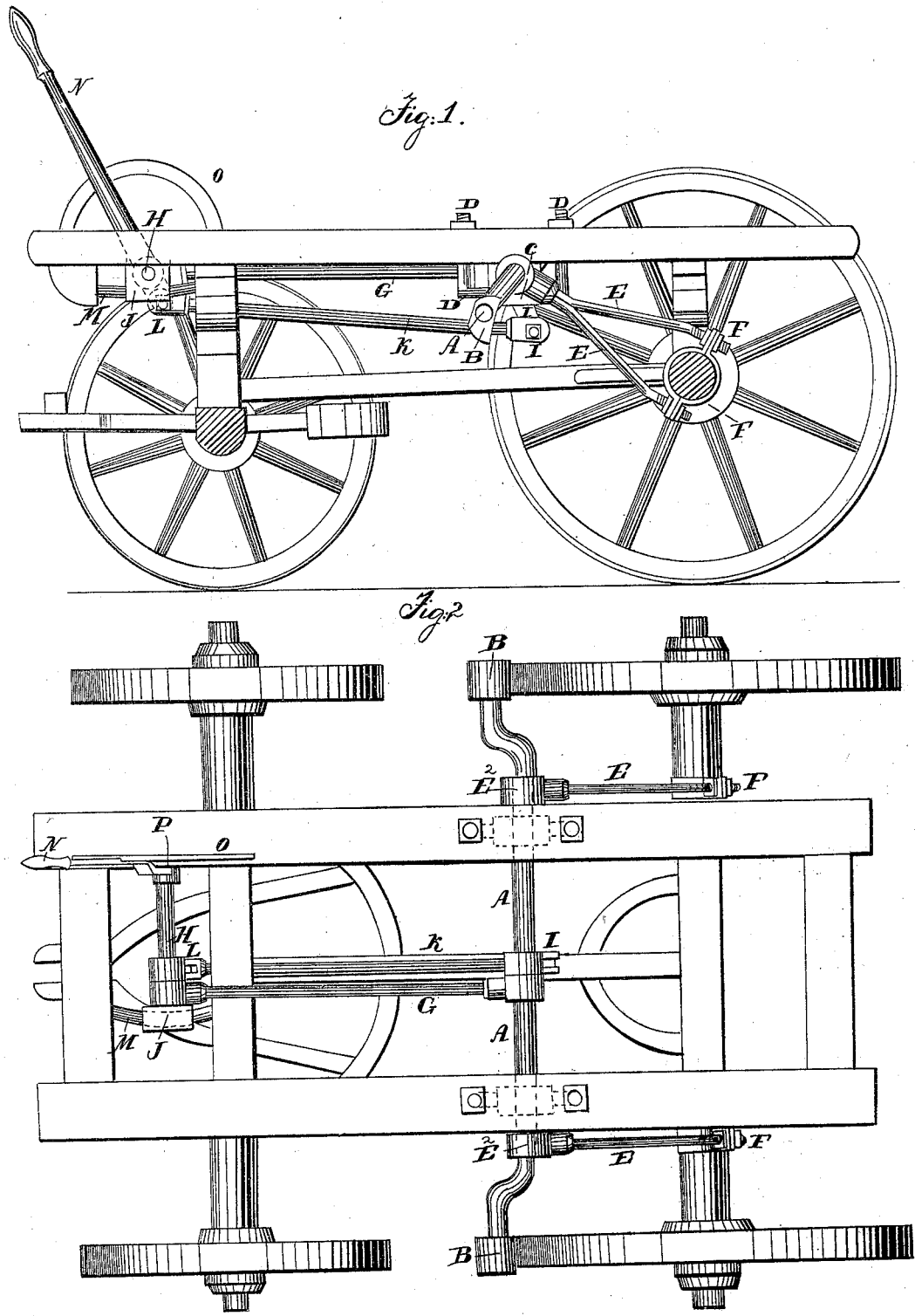

UNITED STATES PATENT OFFICE.

WILLIAM CLAYTON, OF MARSHALLTON, PENNSYLVANIA, ASSIGNOR TO SAMUEL GUSS, OF MARSHALLTON, PENNSYLVANIA.

LOCK OR BRAKE FOR ARRESTING THE MOTION OF SPRING-CARRIAGES.

Specification of Letters Patent No. 2,676, dated June 18, 1842.

*To all whom it may concern:*

Be it known that I, WILLIAM CLAYTON, of Marshallton, in the county of Chester and State of Pennsylvania, have invented a new and useful self-adjustable apparatus to be attached to wheeled carriages, wagons, &c., having elliptical or other springs for arresting their motion in descending hills or inclined planes called "the vibrating self-adjustable carriage-lock," which is described as follows, reference being had to the annexed drawings of the same, making part of this specification, of which—

Figure 1 is a side elevation; Fig. 2, a plan or top view.

Similar letters refer to corresponding parts.

The nature of this invention consists in attaching the vibrating friction bar to the axle tree by rising and falling arms and turning clasps and passing the bar through sliding boxes having a horizontal longitudinal movement back and forth in staples or on ways attached to the carriage body for allowing the friction bar to adjust itself to the curvature of the wheels as the body rises and falls, thus adapting the vibrating friction bar to carriages with springs.

The carriage is made in the usual manner. A transverse vibrating friction bar A with cams or rubbers B on its outer extremities is placed in front of the hind wheels under the carriage body for the purpose of bringing said cams or rubbers against the peripheries of the wheels to produce the necessary rubbing or friction for the purpose intended, and for removing said cams therefrom when not needed. This friction bar is sustained in its transverse position under the carriage body by means of two permanent staples or slide rods D, two sliding boxes C, and two branched arms E, attached to the hind axle of the vehicle by turning clasps F, said friction bar A turning in round apertures in the large ends of the aforesaid arms E by mans hereafter described. The friction bar may be bent near each end in the form of a crank as represented, or it may be straight, in either form acting on the surface of the wheel in the same manner by means of the rubbers on the ends thereof.

A horizontal rod G is attached to the middle of the friction bar A or near the middle thereof and extending to a short vibrating and turning axle H placed in front, under the forward part of the carriage body for keeping the friction bar A and parts connected therewith in trim with the axle and the parts attached thereto as the carriage body rises and falls and the friction bar moves in the segment of a curve.

The vibrating bar A is vibrated by means of the following described combination of parts in addition to the aforesaid vibrating and turning axle and connecting-rod: To or near the middle of the friction bar A is fastened on arm I radiating therefrom, to which, at the lower extremity, is attached a connecting rod K leading to a similar constructed projecting arm L fixed on the aforesaid short horizontally and vertically vibrating axle H. The short axle H above mentioned vibrates or turns vertically in a sliding box J moving on a horizontal curved or segment bar M fixed in the frame of the wagon under the forward part thereof and in a stationary box at P in the side of the wagon body and also vibrates horizontally in the segment of a curve, the last mentioned box being the pivot or center.

A lever N for vibrating said axle is fixed on the same near said stationary box and is extended upward by the side of, or through, the bottom of the body of the vehicle within reach of the driver so that he can lay hold of it conveniently. It is held securely in the position desired for pressing the cams or rubbers hard against the wheels or holding them at a short distance therefrom by means of a notched segment plate O fastened to the carriage body, said lever resting against a tooth or in a notch of said segment plate which thus secures the lever.

The end of the axle H on which the lever is fixed turn in a box fixed permanently to the under side of the body frame at the side thereof at P. The outer end as before stated turns in a segment box J which has a horizontal movement in the segment of a circle as the body rises and falls on a segment way or bar M fixed to the under side of the frame of the body, the circle of which the way or slide bar M is a segment being described from the center of the fixed box before described at P.

During the motion of the carriage and as the body rises and falls vertically or rocks to the right and left the friction bar A adjusts itself to the circumference of the wheels during the various changes in position of the carriage body by means of the aforesaid turning clasps F, rising and falling arms E and the sliding boxes having a longitudinal sliding action on their respective ways and the clasps of the arms a circular movement on the axle tree causing the rubbers or cams to traverse the circumference of the wheels and be always at the same distance from the center thereof, the radial arms E being of the same length and the extremities thereof always at the same distance from the center of the wheels or axle tree of the same, the rubbers or cams on the vibrating or turning friction bar being pressed against the peripheries of the wheels by pushing the upper end of the lever from the operator and securing the same in the notched segment plate, said lever turning the short axle and thus simultaneously turning the friction bar by means of the connecting rod attached to the lower ends of the arms projecting down upon the axle and friction bar, which brings the rubbers against the wheels. To remove the rubbers therefrom the position of the lever must be reversed.

The trim or adjustment of the friction bar to the curvatures of the wheels as the carriage body rises and falls is effected by means of the combination and arrangement of the radial arms and clasps, sliding boxes and connecting rods operating as before described.

What I claim as my invention and which I desire to secure by Letters Patent is—

1. Causing the rubbers on the ends of the vibrating sliding bar to traverse and press against segments of the circumference of the wheels always at the same distance from the center thereof as the carriage body rises and falls vertically by means of the aforesaid combination of branched arms and circular clasps sliding boxes and connecting bar attached to the sliding bar and to the vibrating axle said axle moving horizontally in the segment of a circle described from the center of the permanent box of the same whether the parts for producing the above effect be arranged precisely in the manner above stated, or in any other mode substantially the same.

WILLIAM CLAYTON.

Witnesses:
   Wm. P. Elliot,
   E. Maher.